(12) United States Patent
Li et al.

(10) Patent No.: US 10,143,972 B2
(45) Date of Patent: Dec. 4, 2018

(54) ULTRAFILTRATION MEMBRANE AND A PREPARATION METHOD THEREOF

(71) Applicant: NANJING UNIVERSITY OF SCIENCE AND TECHNOLOGY, Jiangsu (CN)

(72) Inventors: Jiansheng Li, Jiangsu (CN); Shunlong Pan, Jiangsu (CN); Xiaofeng Fang, Jiangsu (CN); Lianjun Wang, Jiangsu (CN); Xiuyun Sun, Jiangsu (CN); Jinyou Shen, Jiangsu (CN); Weiqing Han, Jiangsu (CN); Xiaodong Liu, Jiangsu (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 15/540,260

(22) PCT Filed: Jan. 25, 2016

(86) PCT No.: PCT/CN2016/072041
§ 371 (c)(1),
(2) Date: Jun. 28, 2017

(87) PCT Pub. No.: WO2017/124572
PCT Pub. Date: Jul. 27, 2017

(65) Prior Publication Data
US 2018/0085712 A1 Mar. 29, 2018

(30) Foreign Application Priority Data
Jan. 22, 2016 (CN) .......................... 2016 1 0044661

(51) Int. Cl.
*C02F 1/28* (2006.01)
*C02F 1/44* (2006.01)
(Continued)

(52) U.S. Cl.
CPC ..... *B01D 67/0023* (2013.01); *B01D 67/0041* (2013.01); *B01D 67/0088* (2013.01);
(Continued)

(58) Field of Classification Search
None
See application file for complete search history.

(56) References Cited

U.S. PATENT DOCUMENTS 3,996,131 A * 12/1976 Conn ................... B01D 61/145
    210/636
9,289,727 B2 * 3/2016 Ichinose ................ B01D 69/12
(Continued)

FOREIGN PATENT DOCUMENTS

CA     2893412     8/2014
CN     101791521     8/2010
(Continued)

OTHER PUBLICATIONS

Velu et al., "Performance Enhancement of Polysulfone Ultrafiltration Membrane by Blending with Polyurethane Hydrophilic Polymer", International Journal of Chemical and Analytical Science, 2011, 2(7), 87-92.*

*Primary Examiner* — Krishnan S Menon
(74) *Attorney, Agent, or Firm* — JCIPRNET

(57) ABSTRACT

The present invention provides an ultrafiltration membrane comprising a sulfone polymer membrane matrix with pores and an organic polymer sealing layer, wherein the pores are filled with nanoadsorbents. The present invention further provides a method for preparing the ultrafiltration membrane, which includes the following steps: (1) synthesizing nanoadsorbents; (2) preparing the sulfone polymer membrane matrix by immersion-precipitation phase inversion; and (3) immobilizing nanoadsorbents in the pores of the sulfone polymer membrane matrix by reverse filling, then sealing the pores with organic polymers to form a multi-
(Continued)

functional ultrafiltration membrane. In the present invention, colloidal gold, polyethylene glycol molecules and Pb(II) ions (and so forth) are utilized as models of viruses, macromolecular organic pollutants, and small molecular pollutants, respectively. It is shown that the multifunctional ultrafiltration membrane allows for removal of multiple pollutants from water and can simultaneously remove multiple pollutants under low pressure.

8 Claims, 7 Drawing Sheets

(51) Int. Cl.
| | |
|---|---|
| *B01D 61/02* | (2006.01) |
| *B01D 61/14* | (2006.01) |
| *B01D 67/00* | (2006.01) |
| *B01D 69/02* | (2006.01) |
| *B01D 69/14* | (2006.01) |
| *B01D 71/68* | (2006.01) |
| *B01J 20/26* | (2006.01) |
| *B01J 20/28* | (2006.01) |
| *B01J 20/30* | (2006.01) |

(52) U.S. Cl.
CPC ........... *B01D 69/02* (2013.01); *B01D 69/147* (2013.01); *B01D 69/148* (2013.01); *B01J 20/26* (2013.01); *B01J 20/30* (2013.01); *C02F 1/28* (2013.01); *C02F 1/444* (2013.01); *B01D 61/02* (2013.01); *B01D 61/14* (2013.01); *B01D 71/68* (2013.01); *B01D 2323/286* (2013.01); *B01D 2325/12* (2013.01); *B01J 20/28033* (2013.01); *C02F 1/281* (2013.01); *C02F 2305/08* (2013.01)

(56) References Cited

U.S. PATENT DOCUMENTS

2009/0156426 A1* 6/2009 Schiestel ............ B01D 67/0088
    506/11
2017/0087519 A1* 3/2017 Fortner ................ B01D 69/141

FOREIGN PATENT DOCUMENTS

| | | |
|---|---|---|
| CN | 104039544 | 9/2014 |
| CN | 104492287 | 4/2015 |
| CN | 105107395 | 12/2015 |
| JP | 4596171 | 12/2010 |

* cited by examiner

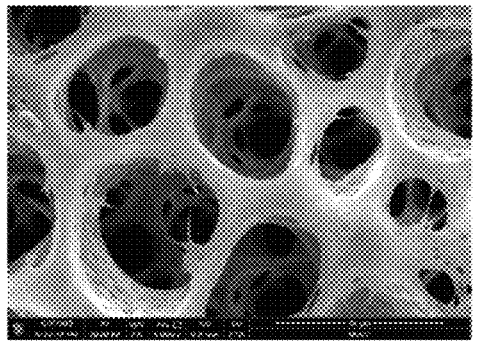
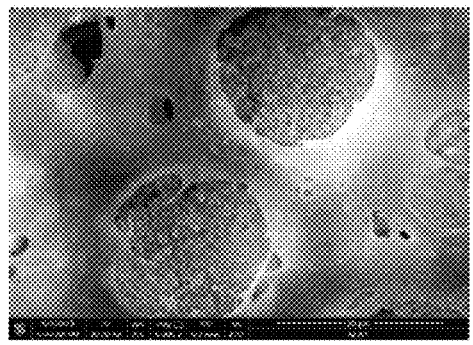
FIG. 2A            FIG. 2B
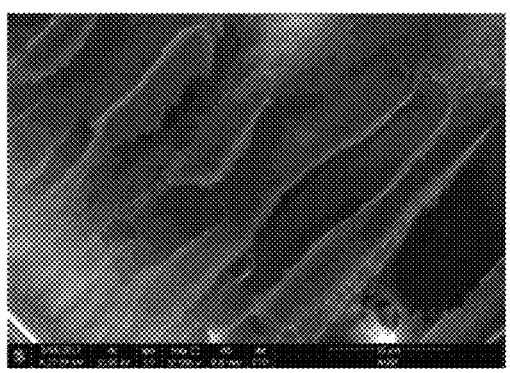
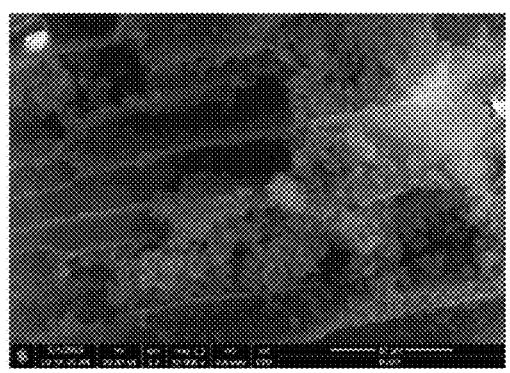
FIG. 2C            FIG. 2D

ULTRAFILTRATION MEMBRANE AND A PREPARATION METHOD THEREOF

CROSS-REFERENCE TO RELATED APPLICATION

This application is a 371 application of International PCT application serial no. PCT/CN2016/072041, filed on Jan. 25, 2016, which claims the priority benefit of Chinese application no. 201610044661.3, filed on Jan. 22, 2016. The entirety of each of the above-mentioned patent applications is hereby incorporated by reference herein and made a part of this specification.

TECHNICAL FIELD

The present invention falls into the field of water treatment, and particularly falls into the field of membrane separation. It relates to an ultrafiltration membrane and a preparation method thereof.

BACKGROUND TECHNOLOGY

Water is an essential substance for all beings on earth to survive. However, wherever it is in the developed countries or in the developing countries, large quantities of pollutants have been discharged into water environment due to human activities and industrial production, causing a shortage of non-polluted water and thereby being a great challenge to public health and safety. Nowadays, each year in the world, there are 884 million people lacking safe drinking water and 1.8 million children died of water pollution related diseases. One of the essential problems to be solved for human development in the future decades is how to obtain safe drinking water. In addition, due to the increasing shortage of resources, another important theme for the future development of the world is energy conservation. However, the conventional water treatment processes require a large consumption of energy and resources. In US, 3~20% of the annual consumption of energy and resources is used for water treatment processes. Therefore, there is a dilemma between the safety of drinking water and the consumption of energy and resources. CuiTently, researchers have developed numerous novel technologies and methods for drinking water treatment to increase the treatment efficiency, to minimize the energy consumption, to reduce the dosage of chemical agents and etc. Among those novel technologies and methods, membrane separation technology and adsorption technology have attracted most of the attention.

The application of membrane separation technology to water treatment has rapidly developed and there is a trend for the membrane technology becoming the core technology in the field of water treatment. Compared with water treatment technologies like sterilization, distillation and media filtration, membrane separation technology can separate pollutants in an efficient, selective and reliable way and without any need of chemical additives, heat energy or restoration. Currently, the membrane separation technology involves four processes, which are microfiltration, ultrafiltration (ultrafiltration), nanofiltration and reverse osmosis. Microfiltration can be used to remove suspended solids, protozoa and bacteria; ultrafiltration can effectively reject viruses and colloids; nanofiltration can achieve the removal of hardness, heavy metal and water-soluble organic substances; and reverse osmosis can be used to desalinize. Water pollutants have a wide size distribution, yet membrane separation technology can achieve an overall physical rejection of those pollutants. However, even though the nanofiltration technology and reverse osmosis technology can effectively remove small molecular water pollutants, the processes involved need to be driven by higher operating pressure and thereby are very energy-consuming. ultrafiltration process may replace the processes of turbidity removal and sterilization. ultrafiltration can reduce water turbidity under 0.1 NTU, resulting in the less or no consumption of coagulants. Pollution by coagulants can be avoided. Further, ultrafiltration can remove almost all of pathogenic microorganisms, thereby reducing the usage of disinfectants, and reducing the amount of disinfection by-products, so as to increase the chemical safety of water.

Adsorption technology is a promising method for removing small molecular water pollutants. It has advantages such as less energy-consuming, easy to operate and the extensive range of application. However, the current adsorption technology uses traditional adsorbents such as activated carbon, zeolites and natural fibers, which present several deficiencies such as low adsorptive capacity, poor adsorption selectivity and weak regeneration ability. Recently, novel nanoadsorbents such as nano-metal oxides, carbon nanotubes and porous graphene, have been attracted great attention of researchers and are given great expectations to overcome the deficiencies of traditional adsorbents. Compared with traditional adsorbents, nanoadsorbents have advantages such as high specific surface areas, short particle diffusion distances, more activated adsorption sites and easy to modify pore structure and surface properties, thereby able to obtain high adsorption capacity. It is easy to functionalize the surface of nanoadsorbents so as to make it selectively adsorptive. However, nanoadsorbents are often prepared in the form of fine powders which cause problems in separation/regeneration processes and potential safety concerns due to them leaching into water bodies. Therefore, the application of nanoadsorbents on the treatment of water is greatly restrained.

Recently, the spatiotemporal coupling technology, integrating multiple water treatment units into one device, has been garnered considerable attention. It can simplify the water treatment processes, increase the water treatment effectiveness, and overcome the deficiencies of single water treatment unit. The spatiotemporal coupling technology is particularly suitable for improving the current decentralized and point-of-use water treatment processes. Inspired by the above research, a strategy that can combine the advantages of nanoadsorbents and ultrafiltration membranes together and overcome their respective drawbacks in water decontamination, has been developed. Specifically, the nanoadsorbents were embedded in an ultrafiltration membrane matrix, forming a blend membrane with dual functions. Such technology has achieved simultaneous removal of small molecular, macromolecular and particulate pollutants under low pressure and overcome the deficiencies of ultrafiltration technology and nanoadsorption technology. However, it is generally accepted that the introduction of nanoadsorbents into polymeric casting solution will inevitably decrease the selectivity of the membranes and affect their performance, that is, the more nanoadsorbents blended in, the more probably the structure of ultrafiltration membrane would be damaged. In order to preserve the ultrafiltration performance, the content of nanoadsorbents in the membrane matrix was normally less, while the adsorption capacity is unsatisfactory. Another concern for blend membrane is that membrane matrix materials would encapsulate the nanoadsorbents blended therein, hence the less active adsorption sites. The deficiencies of traditional adsorption membranes have affected its practical application, therefore, it is of great significance to invent an adsorption ultrafiltration membrane with stable ultrafiltration property and enhanced adsorption capacity.

SUMMARY OF THE INVENTION

Technical Solution

The technical solutions to achieve an object of the invention is as follows.

The present invention provides an ultrafiltration membrane which comprises a sulfone polymer membrane matrix with pores and an organic polymer sealing layer, wherein the pores are filled with nanoadsorbents.

In one preferable embodiment, the nanoadsorbents are immobilized in the pores by reverse filling.

In one preferable embodiment, the pores are formed by immersion-precipitation phase inversion.

In one preferable embodiment, the nanoadsorbents are porous hollow nanoparticles.

In one preferable embodiment, the pores are finger-like in shape.

In one preferable embodiment, the pore sizes are 10~40 μm×90~150 μm; and more preferably, the pore size is 20 μm×120 μm.

In one preferable embodiment, the porosity of the ultrafiltration membrane is 65%~80% before the pores are filled with nanoadsorbents and 35%~50% thereafter; and more preferably, the porosity of the ultrafiltration membrane is 71.2% before the pores are filled with nanoadsorbents and 44.1% thereafter.

In one preferable embodiment, the content of the nanoadsorbents is 10%~70%; and more preferably, the content of the nanoadsorbents is 63.9%.

The present invention also provides a method for preparing the ultrafiltration membrane, which comprises the following steps:
(1) synthesizing nanoadsorbents;
(2) preparing the sulfone polymer membrane matrix by immersion-precipitation phase inversion; and
(3) immobilizing nanoadsorbents in the pores of the sulfone polymer membrane matrix by reverse filling, then sealing the pores with organic polymers to form the ultrafiltration membrane.

In one preferable embodiment, the procedure of immersion-precipitation phase inversion comprises the following steps:
stirring sulfone polymers, polyvinylpyrrolidone and N-N dimethylformamide constantly in oil bath to obtain a uniform and homogeneous casting solution, then leaving the casting solution to stand to remove remaining air bubbles, and spreading the bubbleless casting solution with a casting knife onto a clean glass plate of which the temperature is 60~100° C. to form a membrane;
standing the glass plate in air for evaporation and then immersing it in a non-solvent bath; and
taking out the resulting membrane and rinsing it in deionized (DI) water to obtain the sulfone polymer membrane matrix which is then kept in DI water for later use.

In one preferable embodiment, the procedure of reverse filling comprises the following steps:
dispersing the synthesized nanoadsorbents in water by ultrasound; and
placing the sulfone polymer membrane matrix upside down in a stirred ultrafiltration cell and filling it with filtrated nanoadsorbent solution under controlled pressure, wherein the pressure ranges from 0.01 Mpa to 0.1 Mpa.

In one preferable embodiment, the sulfone polymers are polysulfone and polyethersulfone.

In one preferable embodiment, the organic polymer is polydopamine or polyvinyl alcohol.

In one preferable embodiment, the nanoadsorbents are porous hollow nanoparticles.

In one preferable embodiment, the porous hollow nanoparticles are hollow porous HZO (hydrous zirconium oxide) particles, hollow porous carbon particles or hollow porous ferroferric oxide particles.

After the preparation of multifunctional ultrafiltration membrane is completed, colloidal gold, polyethylene glycol molecules and Pb(II) ions are utilized as models of viruses, macromolecular organic pollutants, and small molecular pollutants respectively. It is shown that the prepared multifunctional ultrafiltration membrane allows for removal of multiple pollutants from water and can simultaneously remove multiple pollutants under low pressure.

Advantageous Effect

The present invention provides a multifunctional ultrafiltration membrane and a preparation method thereof. The multifunctional ultrafiltration membrane has both adsorption ability and separation ability. It can be used to simultaneously remove multiple pollutants from water. The multifunctional ultrafiltration membrane is demonstrated by entrapment of nanoadsorbents into the finger-like pores of the membrane, resulting in a dual-functional membrane with high loading capacity and low mass transfer resistance. The multifunctional ultrafiltration membrane is endowed with adsorption ability to remove small molecular pollutants from water, while the inherent ultrafiltration structure and properties are well maintained. The multifunctional ultrafiltration membrane can simultaneously remove heavy metal and typical organic pollutants, while its ability to reject macromolecular substances is well maintained. The outstanding technical feature of the present invention is that it breaks the trade-off between the content of nanoadsorbents in adsorption membrane and the rejection ability of ultrafiltration membrane, and it fully exposes the adsorption sites of nanoadsorbents. In additional, the multifunctional ultrafiltration membrane can simultaneously remove multiple pollutants under a low operating pressure less than 5% of that adopted in the current membrane treatment method.

Compared with the current adsorption membrane materials, the present invention has the following outstanding advantages: (1) the introduction method of porous hollow nanoparticles into the finger-liked structure of the ultrafiltration membrane is easy to operate and less cost through a simple reverse filling and immobilization; (2) the content of porous hollow nanoparticles in the ultrafiltration membrane matrix can be adjusted by controlling the concentration of porous hollow nanoparticles and the flow rate; (3) the ultrafiltration membrane matrix can store a large number of porous hollow nanoparticles and hold on its original structure due to its high porosity, and then its effective ultrafiltration can be achieved. Therefore, it breaks the trade-off between the content of nanoadsorbents in adsorption membrane materials and the rejection ability of ultrafiltration membrane, and it fully exposes the adsorption sites of nanoadsorbents; (4) the porous and hollow structure of porous hollow nanoparticles can provide express mass transfer passages for water molecules, resulting in the reduction of membrane flux loss due to the blocking of finger-liked pores by the immobilization of nano material; (5) the multifunctional ultrafiltration membrane can simultaneously remove multiple pollutants under a low operating pressure less than 5% of that adopted in the current membrane treatment method (such as reverse osmosis and nano filtration). Therefore, the application perspective of multifunctional adsorption membrane prepared by the above method is extensive in the field of water purification.

BRIEF DESCRIPTION OF THE DRAWINGS

FIG. 1A and FIG. 1B includes electron microscopy images of hollow HZO particles, wherein FIG. 1A is a TEM (transmission electron microscope) image of the hollow HZO particles prepared according to Embodiment 1 in the present invention; and FIG. 1B is a SEM (scanning electron microscopy) image of the hollow HZO particles prepared according to Embodiment 1 in the present invention.

FIG. 2A to FIG. 2D includes SEM images of the cross-section and bottom of the blank membrane and the multifunctional membrane, wherein FIG. 2A is a SEM image of the bottom of the PES ultrafiltration membrane prepared according to Embodiment 1 in the present invention; FIG. 2B is a SEM image of the bottom of the multifunctional adsorption membrane prepared according to Embodiment 1 in the present invention; FIG. 2C is a SEM image of the cross-section of the PES ultrafiltration membrane prepared according to Embodiment 1 in the present invention; and FIG. 2D is a SEM image of the cross-section of the multifunctional adsorption membrane prepared according to Embodiments 1-3 in the present invention.

FIG. 3A to FIG. 3D includes SEM images of the bottom and cross-section of the multifunctional membrane and corresponding scanning images of Zr energy spectrum, wherein FIG. 3A is a SEM image of the bottom of the multifunctional membrane prepared according to Embodiment 1 in the present invention; FIG. 3B is a scanning image of Zr energy spectrum with respect to FIG. 3A; FIG. 3C is a SEM image of the cross-section of the multifunctional membrane prepared according to Embodiment 1 in the present invention; and FIG. 3D is a scanning image of Zr energy spectrum with respect to FIG. 3C.

DETAILED ILLUSTRATION OF THE EMBODIMENTS

Figure 9:
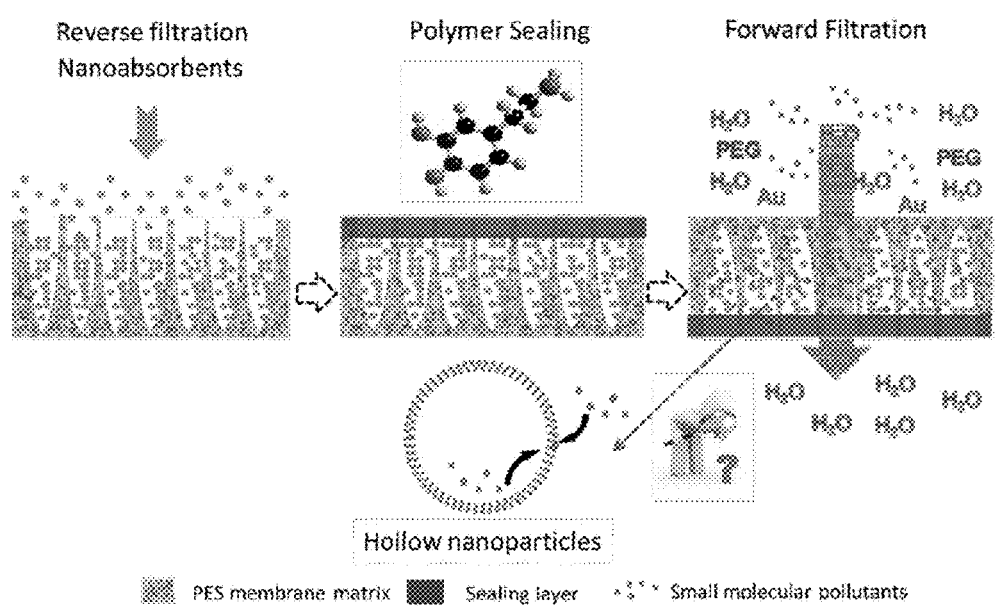
FIG. 9 shows the schematic representation of prepared and applied process for multifunctional membrane according to Embodiment 1 in the present invention.

The following embodiments aim to make persons skilled in the art understand the present invention more comprehensively, yet in no way to limit the scope of the present invention. FIG. 9 shows the schematic representation of prepared and applied process for multifunctional membrane according to Embodiment 1 in the present invention. The ultrafiltration membrane consists of pores formed by the sulfone polymer membrane matrix and an organic polymer sealing layer, and the pores are filled with nanoadsorbents.

As illustrated in FIG. 9, the pores of the ultrafiltration membrane are finger-like in shape, and the pore sizes of the ultrafiltration membrane are 10~40 μm ×90~150 μm; the porosity of the ultrafiltration membrane is 65%~80% before the pores are filled with nanoadsorbents and 35%~50% thereafter; and the content of nanoadsorbents is 10%~70%.

The ultrafiltration membrane is prepared by the following steps:
(1) synthesizing nanoadsorbents;
(2) preparing the sulfone polymer membrane matrix by immersion-precipitation phase inversion; and
(3) immobilizing nanoadsorbents in the pores of the sulfone polymer membrane matrix by reverse filling, then sealing the pores with organic polymers to form the ultrafiltration membrane.

The procedure of immersion-precipitation phase inversion comprises the following steps:
(1) stirring sulfone polymers, polyvinylpyrrolidone and N—N dimethylformamide constantly in oil bath to obtain a uniform and homogeneous casting solution, then leaving the casting solution to stand to remove remaining air bubbles, and spreading the bubbleless casting solution with a casting knife onto a clean glass plate of which the temperature is 60~100° C. to form a membrane;
(2) standing the glass plate in air for evaporation and then immersing it in a non-solvent bath; and
(3) taking out the resulting membrane and rinsing it in DI water to obtain the sulfone polymer membrane matrix which is then kept in DI water for later use.

The procedure of reverse filling comprises the following steps:
(1) dispersing the synthesized nanoadsorbents in water by ultrasound; and
(2) placing the sulfone polymer membrane matrix upside down in a stirred ultrafiltration cell and filling it with filtrated nanoadsorbent solution under controlled pressure, wherein the pressure ranges from 0.01 Mpa to 0.1 Mpa.

The ultrafiltration membrane in the present invention has both adsorption function and rejection function, thereby shortened as multifunctional ultrafiltration membrane. In the present invention, colloidal gold, polyethylene glycol molecules and Pb(II) ions are utilized as models of viruses, macromolecular organic pollutants, and small molecular pollutants respectively. The water treatment performance of multifunctional membranes is verified by these models. It is shown that the ultrafiltration rejection of multifunctional membranes can remove pollutants such as viruses, bacteria and organic pollutants, while the adsorbents stored in the membrane matrix can further remove small molecular pollutants.

Embodiment 1

Step 1. Synthesis of Porous Hollow Nanoparticles

Porous hollow HZO particles were voted as the porous hollow nanoparticles model in the present embodiment.

The preparation of porous hollow HZO particles comprised four steps. (1) to prepare $SiO_2$ particles, 18 mL concentrated ammonia and 49.5 mL water were added to 32.5 mL ethanol. After stirring for 30 min, a mixture of 9 mL tetraethoxysilane and 91 mL absolute alcohol was added. The reaction mixture was further stirred for 8 h. The resultant colloids were centrifuged, fully washed with distilled water and alcohol for three times, and then redispersed in 320 mL absolute ethanol; (2) 1.0 mL distilled water and 0.75 g Brij-35 were added into the above obtained solution and stirred for 2 h before a mixture of 4.5 mL Zirconium n-butoxide and 45.5 mL absolute alcohol were added. The reaction mixture was stirred for another 8 h before the products were collected through centrifugation and redispersed in water (50 mL). After aging for 12 h, the composites were collected and dried; (3) the above obtained product was extracted with acetone for 24 hours to remove the template agent Brij-35; (4) the template agent removed product was treated with NaOH (5 M) for 20 h to remove silica, and the porous hollow HZO particles was obtained for further use.

Figure 1A:
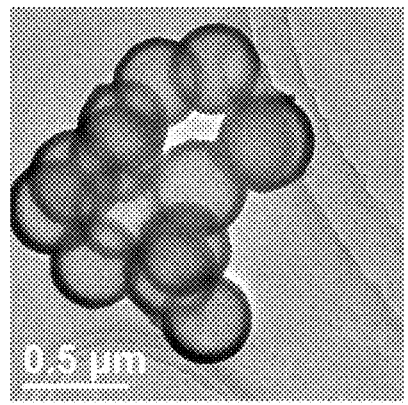
Figure 1B:
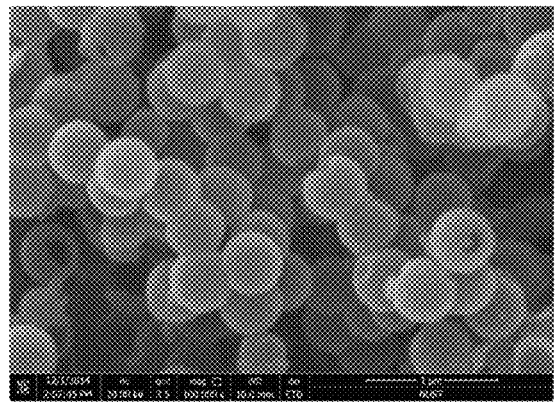

FIG. 1A and FIG. 1B includes electron microscopy images of hollow HZO particles, wherein FIG. 1A is a TEM image of the hollow HZO particles; and FIG. 1B is a SEM image of the hollow HZO particles. As shown in FIG. 1A, a large number of hollow spherical particles with diameters of 400~500 nm have been synthesized. The hollow structure was further proved by the color of surrounding part for the particle is deep while the color of middle part for particle is light in the images. As illustrated in FIG. 1B, the synthesized hollow HZO particle were spherical and the average diameter thereof was about 400~500 nm. The large particles were formed by aggregations of nano-scaled particles. Some spherical particles were cracked and exposed their shell constructions. Nano-scaled particles with diameters of 400~500 nm have higher specific surface area and more adsorption site, resulting in high adsorption capacity.

Step 2. Preparation of a Polyether Sulphone (PES) Ultrafiltration Membrane Matrix The present embodiment used polyether sulphone (PES) to prepare sulfone polymer membrane matrix by immersion-precipitation phase inversion. 16 g polyether sulphone (PES), 8 g polyvinylpyrrolidone (PVP) and 76 g N-N dimethylformamide were mixed and stirred in 70° C. oil bath for 5 hours to obtain a uniform and homogeneous casting solution. Remaining air bubbles that appeared due to the stirring of the casting solutions were removed by leaving the prepared solutions to stand for more than 12 hours. Afterwards, the solution was spread with a casting knife onto a clear glass plate of which the temperature was 60° C. at 25° C., 60% humidity. After being stood in air for 5 s, the resulting membrane was immersed in non-solvent bath for half an hour, then rinsed with DI water, and preserved in DI water before use. The rejection of the prepared PES ultrafiltration membrane matrix for 1 g/L bovine serum albumin (BSA, 67000 Mw) was 95.5%, and the pure water flux of the prepared PES ultrafiltration membrane matrix was 384.6 L/m²·h·bar.

FIG. 2A to FIG. 2D includes SEM images of the cross-section and bottom of the blank PES membrane and the multifunctional membrane, wherein FIG. 2A is a SEM image of the bottom of the PES ultrafiltration membrane; FIG. 2B is a SEM image of the bottom of the multifunctional membrane; FIG. 2C is a SEM image of the cross-section of the PES ultrafiltration membrane; and FIG. 2D is a SEM image of the cross-section of the multifunctional membrane. As shown in FIG. 2A and FIG. 2B, straight finger-like pores in the cross-section can be clearly observed while the average pore diameter on the bottom surface are estimated to be 10~40 μm in diameters and 90~150 μm in depth. The straight finger-like pores of the cross-section penetrate through the supporting layer of the membrane. As shown in FIG. 2B and FIG. 2C, a large number of hollow HZO particles were located in the finger-like pores of the membrane, and the highly porous finger-like pores acted as a 'warehouse' for the hollow HZO particles.

Step 3. Preparation of a Multifunctional Membrane

The prepared PES membrane matrix was placed upside down in a stirred ultrafiltration cell (Amicon 8050, Millipore, USA) and the porous hollow HZO particles obtained in Step 1 were dispersed in water. The resulting porous hollow HZO particle solution was then added into the cell for immobilization. The immobilization operation was conducted at different pressures ranging from 0.01 Mpa to 0.1 Mpa. After the immobilization was completed, the bottom pores of the PES membrane were sealed with 20 mL dopamine solution (2 g/L) and then the sealed matrix was washed to form a multifunctional membrane. The weight fraction of the porous hollow HZO particles reached 68.9 wt % of the membrane matrix. The rejection of the multifunctional membrane for 1 g/L bovine serum albumin (BSA, 67000 Mw) was 95.4%, and the pure water flux of the multifunctional membrane is 212.2 L/m²·h·bar.

Figure 3A:
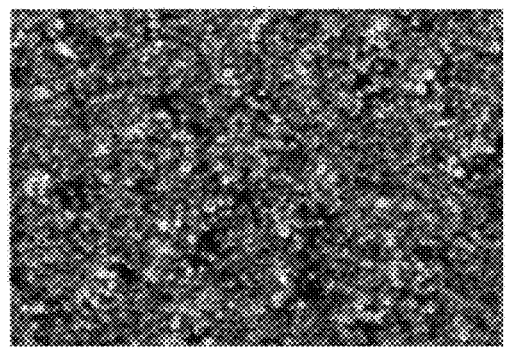
Figure 3B:
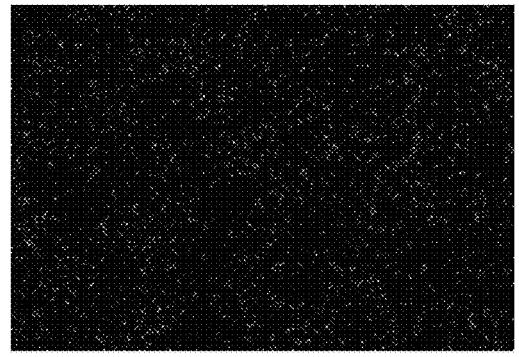
Figure 3C:
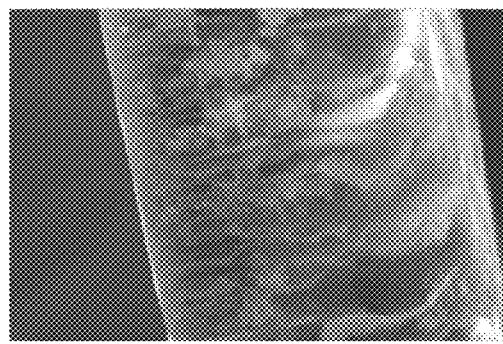
Figure 3D:
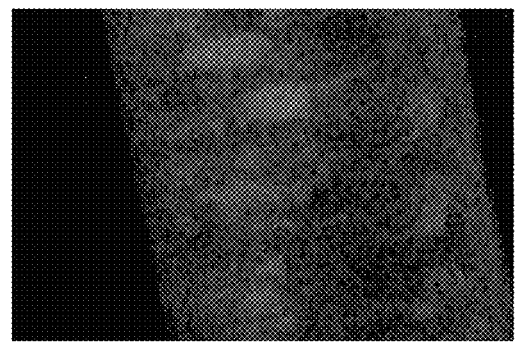

FIG. 3A to FIG. 3D includes SEM images of the bottom and cross-section of the multifunctional membrane and corresponding scanning images of Zr energy spectrum. FIG. 3A is a SEM image of the bottom of the multifunctional membrane; FIG. 3B is a scanning image of Zr energy spectrum with respect to FIG. 3A; FIG. 3C is a SEM image of the cross-section of the multifunctional membrane; and FIG. 3D is a scanning image of Zr energy spectrum with respect to FIG. 3C. As shown in FIG. 3A and FIG. 3B, the hollow HZO particles were homogeneously distributed in the bottom pores of the multifunctional membrane. As further shown in FIG. 3C and FIG. 3D, the hollow HZO particles were well immobilized in the finger-like pores of the membrane.

Figure 4:
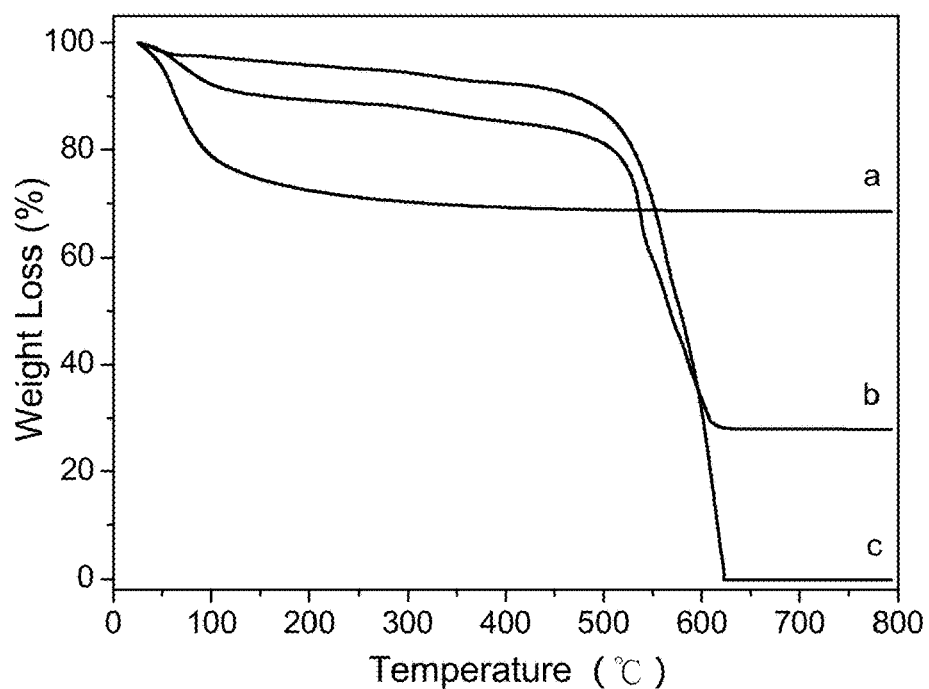
FIG. 4 shows TGA (thermogravimetric analysis) curves. Curve (a) represents the TGA of the porous hollow HZO particles prepared according to Embodiment 1 in the present invention; curve (b) represents the TGA of the multifunctional membrane prepared according to Embodiment 1 in the present invention; and curve (c) represents the TGA of the PES ultrafiltration membrane prepared according to Embodiment 1 in the present invention.

Thermogravimetric analysis (TGA) was used to quantify the content of the hollow HZO particles in the membrane (FIG. 4). Curve (a) is the TGA of the hollow HZO particles prepared according to Step 1; curve (b) is the TGA of the multifunctional membrane prepared according to Step 3; and curve (c) is the TGA of the PES ultrafiltration membrane prepared according to Step 2. Curve (a) is the weight loss curve of the hollow HZO particles being calcined in air from room temperature to 800° C. The lose weight of hollow HZO particles was appeared after high temperature calcination due to large amounts of hydroxyl and bound water in the above synthesized hollow HZO particles. The calcined products, hollow zirconium oxide (ZO) particles, accounted for 68.8% of the total sample weight. Curve (b) shows the weight loss of the multifunctional membrane being calcined in air from room temperature to 800° C. The calcined products, hollow ZO particles, accounted for 27.9% of the weight of the multifunctional membrane. Curve (c) shows the weight loss curve of the PES ultrafiltration membrane being calcined in air from room temperature to 800° C. The membrane matrix would be decomposed with no residues after calcination, since the membrane matrix is made of organic matters.

According to the TGA and equation (1), the content of hollow HZO particles in the membrane can reach 68.9 wt %.

$$\left| \begin{array}{c} \text{the content of porous hollow } HZO \text{ particles} \\ \text{in the multifunctional membrane (wt\%)} \end{array} \right| = \\ \dfrac{\dfrac{\text{the content of the } ZO \text{ particles in the porous hollow } HZO \text{ particles (wt\%)}}{\text{the content of the } ZO \text{ particles in the porous hollow } HZO \text{ particles (wt\%)}}}{1 - \dfrac{\text{the content of the } ZO \text{ particles in the porous hollow } HZO \text{ particles (wt\%)}}{\text{the content of the } ZO \text{ particles in the porous hollow } HZO \text{ particles (wt\%)}}} \quad (1)$$

Figure 5:
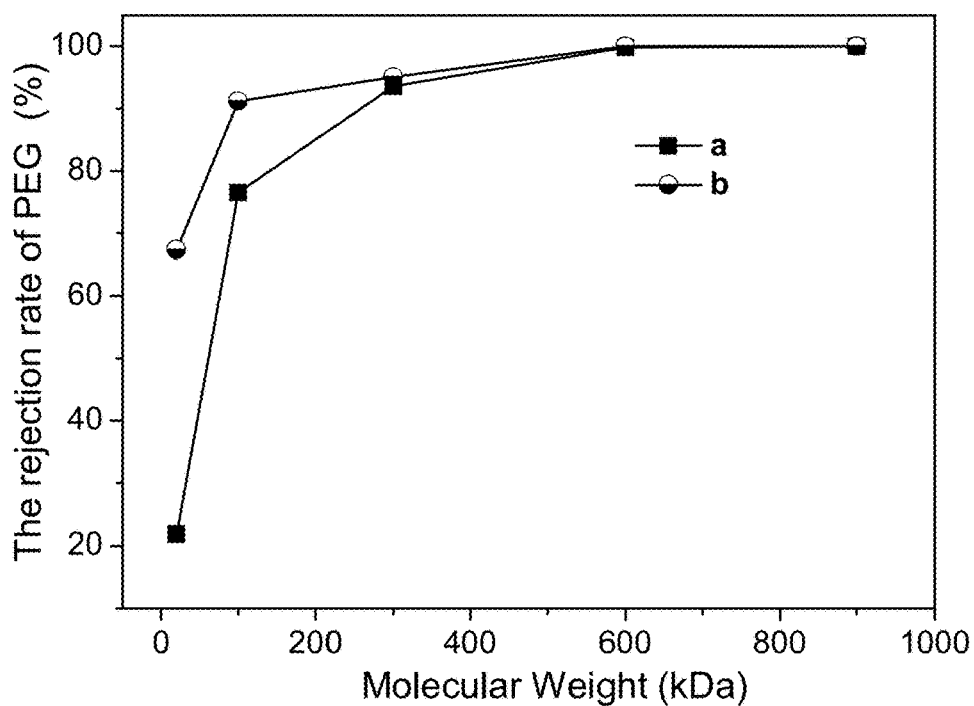
FIG. 5 shows MWCO (molecular weight cut off) curves of blank membranes and multifunctional membranes. Curve (a) represents the MWCO of the multifunctional adsorption membrane prepared according to Embodiment 1 in the present invention; and curve (b) represents the MWCO of the PES ultrafiltration membrane prepared according to Embodiment 1 in the present invention.
Figure 6A:
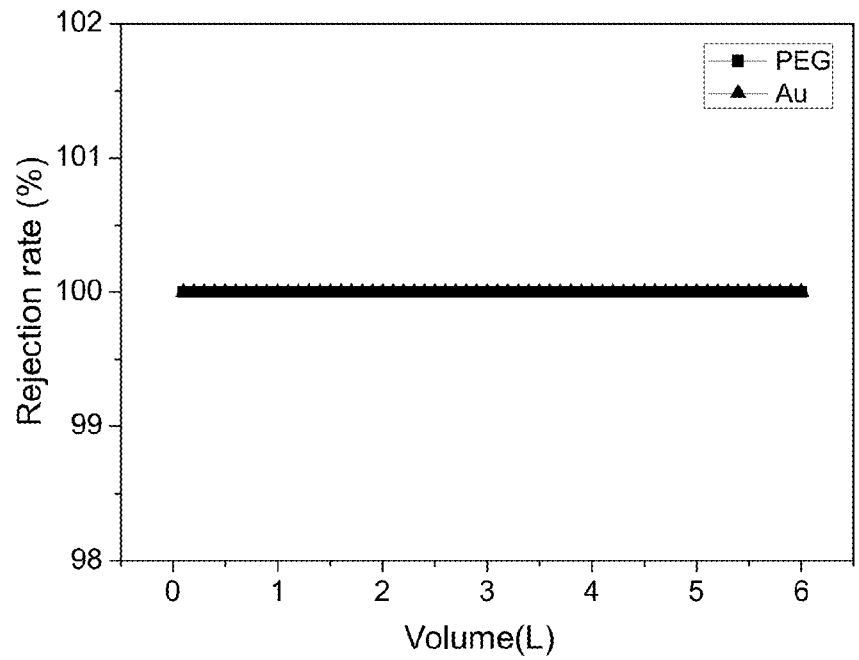
FIG. 6A and FIG. 6B illustrates that the rejection of the multifunctional membrane prepared according to Embodiment 1 in the present invention, with respect to PEG (molecular weight: 600 kDa) and colloidal gold (particulate diameter: 25 nm).
Figure 6B:
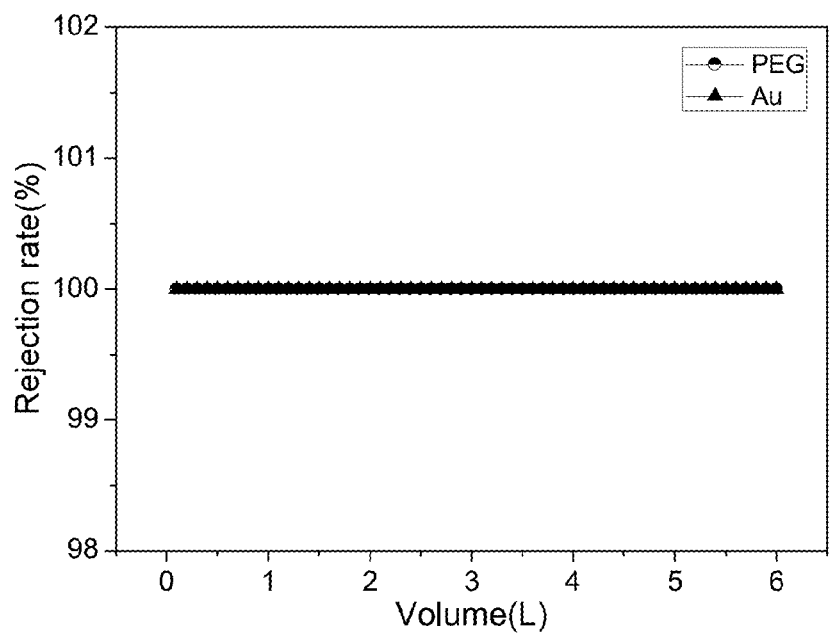
Figure 7:
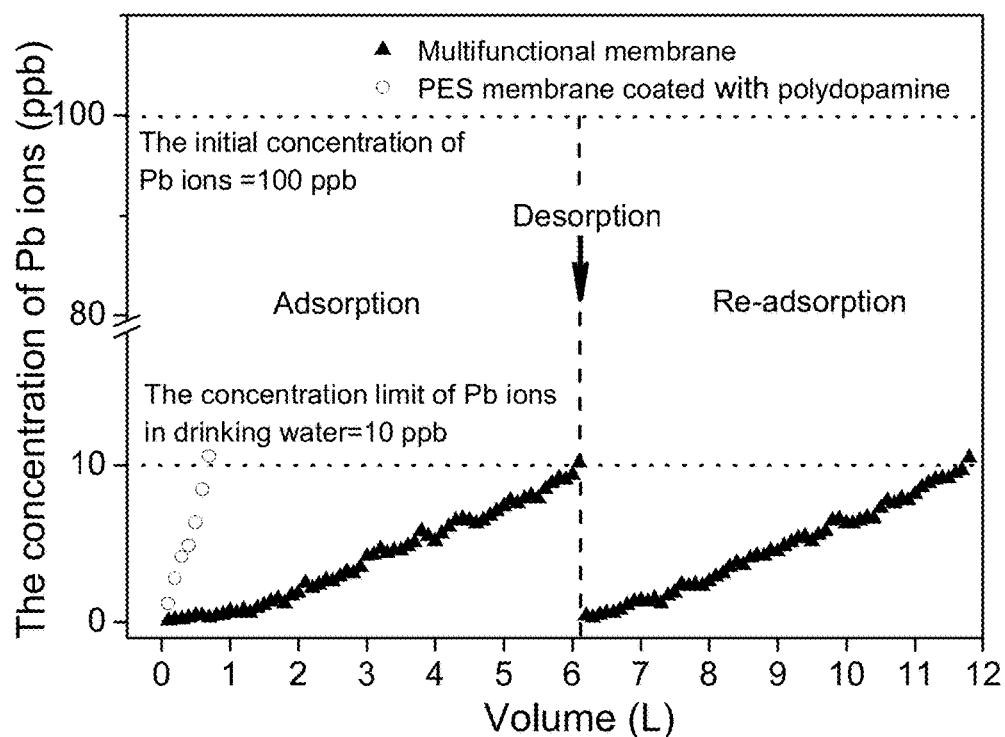
FIG. 7 illustrates the rejection of the multifunctional membrane prepared according to Embodiment 1 in the present invention, with respect to Pb ions (concentration: 100 μg/L).

FIG. 5 shows MWCO (molecular weight cut off) curves of the blank PES ultrafiltration membrane and the multifunctional membrane. Curve (a) is the MWCO of the multifunctional membrane prepared according to Step 3; and curve (b) is the MWCO of the PES ultrafiltration membrane prepared according to Step 2. They reflect the rejection effectiveness of the blank PES ultrafiltration membrane and the multifunctional membrane for polyethylene glycol (PEG) with different molecular weights. It can be shown that the blank PES ultrafiltration membrane and the multifunctional membrane were both able to completely reject PEG more than 600 kDa, and the rejection effectiveness of multifunctional membrane was much higher than that of blank PES ultrafiltration membrane for PEGs ranging from 20 to 600 kDa. The results further demonstrate that the immobilization of 68.9 wt % hollow HZO particles in the pores of the PES ultrafiltration membrane did not affect its ultrafiltration performance.

Performance test was performed by placing the multifunctional membrane and polydopamine (PDA)-modified blank PES ultrafiltration membrane in a cylindrical stirred ultrafiltration cell (Model 8050, Millipore). Water containing "multiple pollutants", including 100 μ u/L Pb(II) as a model ionic pollutant, 5 mg/L 25 nm colloidal gold as a model virus or bacteria, 50 mg/L PEG (Mw=60 KDa) as a model colloid pollutants were investigated. The filtration flux was 20 L/m²·h·bar. In order to determine the pollutant saturation of the membranes, the solution was filtrated and analyzed in 100 mL intervals.

As illustrated in FIG. 6A, FIG. 6B and FIG. 7, 6 L water containing "multiple pollutants" can be treated by the multifunctional membrane in one run. The reusability of multifunctional membrane can be realized by multiple adsorption-desorption runs. In addition, the adsorption performance for the blank PES ultrafiltration membrane after PDA modification was investigated. The effective treatment volume of the blank PES ultrafiltration membrane after PDA modification was 0.7 L. Both of the blank PES membrane after PDA modification and the multifunctional membrane can keep rejecting colloidal gold and PEGs all the time.

Figure 8:
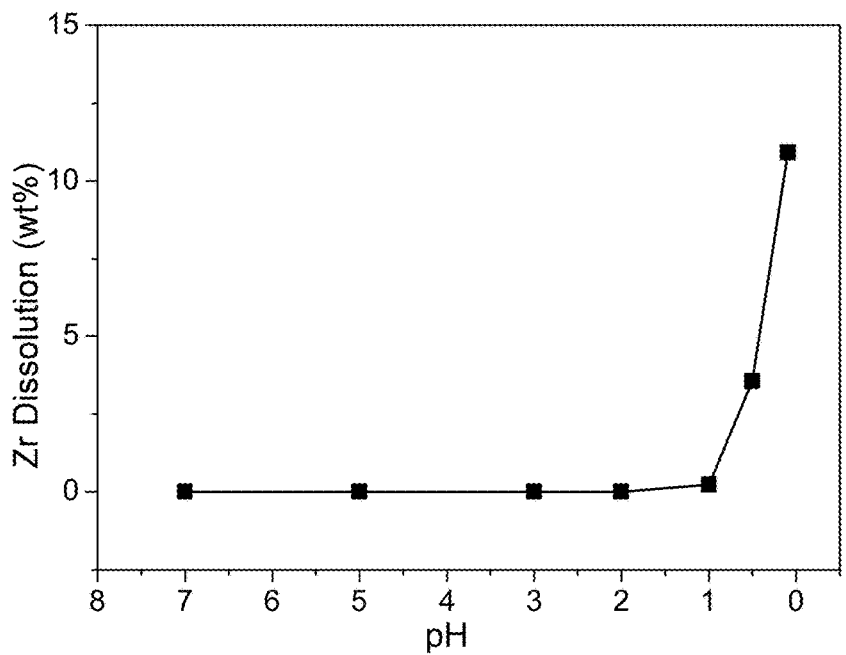
FIG. 8 illustrates the stabilities of the multifunctional membrane prepared according to Embodiment 1 in the present invention under different pH conditions.

FIG. 8 illustrates the stability of multifunctional membrane prepared according to Step 3 under different pH conditions. In order to evaluate the stability of the multifunctional membrane under different pH conditions, the multifunctional membrane was immersed into aqueous solutions with different pH ranging from 0.1 to 7 for 96 h, and the content of Zr in supernatant was analyzed. As can be seen from FIG. 8, no Zr ions can be detected when the pH of the solution is higher than 2, indicating the multifunctional membrane was stable in a solution with a pH higher than 2, so that the multifunctional membrane can desorb under acidic conditions in application process.

As shown in FIG. 9, the multifunctional membrane was prepared and applied by the following steps. Hollow HZO particles were immobilized in the finger-like pores of PES ultrafiltration membrane during reverse filtration in the first step. The polydopamine coating was used to 'seal' the hollow HZO particles within the finger-like cavities of the polyether sulphone (PES) membrane. The prepared multifunctional membrane allows for the removal of multiple pollutants from water (colloidal gold and polyethylene glycol as models) as conventional ultrafiltration membrane does, and the removal of toxic pollutants from water (Pb(II) as one example) due to the remarkable adsorption performance of hollow HZO particles.

Embodiment 2

Step 1. Synthesis of Porous Hollow Nanoparticles

Porous hollow carbon particles were voted as the porous hollow nanoparticles model in the present embodiment.

1.04 g CTAC (25 wt %) was added to a mixed solution of 19 mL distilled water, 0.1 mL aqueous ammonia and 5 mL anhydrate alcohol, and the mixture was stirred for 30 min. Then, 0.2 g m-dihydroxybenzene was added and stirred for 30 min. After that, 0.72 mL tetraethoxysilane and 0.28 mL formaldehyde were added and stirred for 24 h at 30° C. After the reaction was completed, solids were recovered by centrifugation and air-dried at 80° C. for 12 hours. The dried solid was calcined in nitrogen, at 200° C., 350° C., 500° C. and 600° C. for 2 hours, respectively, and then continued to be calcined at 800° C. for 5 hours. Finally, porous hollow carbon particles were obtained. In the present embodiment, a large number of hollow-structured spherical particles with the sizes of 200~300 nm were produced.

Step 2. Preparation of a Poly Sulfone Ultrafiltration Membrane Matrix

The present embodiment used poly sulfone (PS) to prepare a sulfone polymer membrane matrix by immersion-precipitation phase inversion. 16 g poly sulfone (PS), 8 g polyvinylpyrrolidone (PVP) and 76 g N-N dimethylformamide were mixed and stirred in 70° C. oil bath for 5 hours to obtain a uniform and homogeneous casting solution. Remaining air bubbles were removed by leaving the prepared solution to stand for more than 12 h. Afterwards, the solution was spread with a casting knife onto a clear glass plate of which the temperature was 60° C. at 25° C., 60% humidity. After being stood in air for 5 s, the resulting membrane was immersed in non-solvent bath for half an hour, then rinsed with DI water, and preserved in DI water before use. The rejection of the prepared PS ultrafiltration membrane matrix for 1 g/L bovine serum albumin (BSA, 67000 MW) was 95.5%, and the pure water flux of the prepared PS ultrafiltration membrane matrix was 384.6 L/m²·h·bar.

The prepared PS ultrafiltration membrane was provided with large pores on the bottom surface and straight finger-like pores on the cross-section. Sizes of the large pores were 10~20 μm in diameter. The straight finger-like pores penetrated through the supporting layer of the membrane. A large number of porous hollow carbon particles were immobilized in the finger-like pores which were acted as a 'warehouse' for the porous hollow carbon particles.

Step 3. Preparation of a Multifunctional Membrane

The PS membrane matrix obtained in Step 2 was placed upside down in a stirred ultrafiltration cell (Amicon 8050, Millipore, USA) and the porous hollow carbon particles obtained in Step 1 were dispersed in water. The resulting porous hollow carbon particle solution was then added into the cell for immobilization. The immobilization operation was conducted at different pressures ranging from 0.01 Mpa to 0.1 Mpa. After the immobilization was completed, the bottom pores of the PS membrane matrix were sealed with 20 mL dopamine solution (2 g/L) and then the sealed matrix was washed to form a multifunctional membrane. The rejection of the multifunctional membrane for 1 g/L bovine serum albumin (BSA, 67000 Mw) was 95.1%, and the pure water flux of the multifunctional membrane is 192 $L/m^2 \cdot h \cdot bar$.

Performance test was performed by placing the multifunctional membrane and the PS ultrafiltration membrane in a cylindrical stirred ultrafiltration cell (Model 8050, Millipore). Water containing "multiple pollutants", including 5 mg/L methylene blue as a model ionic pollutant, 5 mg/L 25 nm colloidal gold as a model virus or bacteria, 50 mg/L PEG (Mw=60 KDa) as a model colloid pollutants were investigated. The filtration flux was 20 $L/m^2 \cdot h \cdot bar$. In order to determine the pollutant saturation of the membranes, the solution was filtrated and analyzed in 100 mL intervals.

In the present embodiment, the porous hollow carbon particles were homogeneously loaded in the bottom pores of the multifunctional membrane and they were well immobilized in the finger-like pores. The porous hollow carbon particles, PS ultrafiltration membrane and the multifunctional membrane were calcined in nitrogen from room temperature to 800° C. According to analysis, the product was hollow carbon particles which accounted for 25.9% (wt %) of the multifunctional membrane.

The MWCO (molecular weight cut off) curve of the blank PS ultrafiltration membrane was compared to that of the multifunctional membrane. It can be shown that the PES ultrafiltration membrane and the multifunctional membrane were both able to completely reject PEG more than 600 kDa, and the PEG rejection of the multifunctional membrane was much higher than that of PES ultrafiltration membrane for the MWCO ranging from 20 to 600 kDa. The results further demonstrate that the immobilization of 27.9 wt % hollow carbon particles in the pores of the PES ultrafiltration membrane did not affect its ultrafiltration performance.

According to test results, 6 L water containing "multiple pollutants" can be treated by the multifunctional membrane in one run. The reusability of multifunctional membrane can be realized by multiple adsorption-desorption runs. In addition, the adsorption performance for the blank PS ultrafiltration membrane after PDA modification was investigated. The effective treatment volume of the blank PS ultrafiltration membrane after PDA modification was 0.7 L. Both of the blank PS membrane after PDA modification and the multifunctional membrane can keep rejecting colloidal gold and PEGs all the time.

Embodiment 3

Step 1. Synthesis of Porous Hollow Nanoparticles

Porous hollow ferroferric oxide particles are voted as the porous hollow nanoparticles model in the present embodiment.

The porous hollow ferroferric oxide particles were synthesized by a one-step hydrothermal method. 2 nunol ferric chloride, 4 mmol sodium citrate and 6 mmol urea were dissolved in 40 mL, and then 0.3 g of polyacrylamide was added into the above mixture. The mixture solution was stirred until the PAM was completely dissolved. The solution was then sealed in Teflonlined stainless-steel autoclave and reacted at 200° C. for 12 h. Afterwards, the resulting solution was cooled to room temperature. Black solids were collected and washed with water and absolute ethanol in turns. The porous hollow ferroferric oxide particles were obtained after vacuum drying. In the present embodiment, a large number of porous hollow ferroferric oxide particles with the sizes of 200~300 nm were produced.

Step 2. Preparation of a PES Ultrafiltration Membrane

The present embodiment used polyether sulphone (PES) to prepare a sulfone polymer membrane matrix by immersion-precipitation phase inversion. 16 g polyether sulphone (PES), 8 g polyvinylpyrrolidone (PVP) and 76 g N—N dimethylformamide were mixed and stirred in 70° C. oil bath for 5 hours to obtain a uniform and homogeneous casting solution. Remaining air bubbles were removed by leaving the prepared solution to stand for more than 12 h. After being stood in air for 5 s, the resulting membrane was immersed in non-solvent bath for half an hour, then rinsed with DI water, and preserved in DI water before use. The rejection of the prepared PES ultrafiltration membrane for 1 g/L bovine serum albumin (BSA, 67000 Mw) was 95.5%, and the pure water flux of the prepared PES ultrafiltration membrane was 384.6 $L/m^2 \cdot h \cdot bar$.

The prepared PES ultrafiltration membrane was provided with large pores on the bottom surface and straight finger-like pores on the cross-section. Sizes of the large pores were 10~20 μm in diameter. The straight finger-like pores penetrated through the supporting layer of the membrane. A large number of porous hollow ferroferric oxide particles were immobilized in the finger-like pores which were acted as a 'warehouse' for the porous hollow ferroferric oxide particles.

Step 3. Preparation of a Multifunctional Membrane

The PES membrane matrix obtained in Step 2 was placed upside down in a stirred ultrafiltration cell (Amicon 8050, Millipore, USA) and the porous hollow ferroferric oxide particles obtained in Step 1 were dispersed in water. The resulting porous hollow ferroferric oxide particle solution was then added into the cell for immobilization. The immobilization operation was conducted at different pressures ranging from 0.01 Mpa to 0.1 Mpa. After the immobilization was completed, the bottom pores of the PES membrane matrix were sealed with crosslinked polyvinyl alcohol and then the sealed matrix was washed to form a multifunctional membrane. The rejection of the multifunctional membrane for 1g/L bovine serum albumin (BSA, 67000 Mw) was 94.1%, and the pure water flux of the multifunctional membrane is 235 $L/m^2 \cdot h \cdot bar$.

Performance test was performed by placing the multifunctional membrane and the PES ultrafiltration membrane in a cylindrical stirred ultrafiltration cell (Model 8050, Millipore). Water containing "multiple pollutants", including 1000 μg/L chromate as a model ionic pollutant, 5 mg/L 25 run colloidal gold as a model virus or bacteria, 50 mg/L PEG (Mw=60 KDa) as a model colloid pollutants were investigated. The filtration flux was 20 $L/m^2 \cdot h \cdot bar$. In order to determine the pollutant saturation of the membranes, the solution was filtrated and analyzed in 100 mL intervals.

In the present embodiment, the porous hollow ferroferric oxide particles were homogeneously loaded in the bottom pores of the multifunctional membrane and they were well immobilized in the finger-like pores.

The porous hollow ferroferric oxide particles and the PES ultrafiltration membrane were calcined in air from room temperature to 800° C. The calcined product of porous hollow ferroferric oxide particles was $Fe_2O_3$. The membrane matrix was decomposed with no residues after calcination since it was made of organic matters. According to analysis, the content of porous hollow ferroferric oxide particles immobilized in the pores reached 49.7 wt %.

The MWCO (molecular weight cut off) curve of the blank PES ultrafiltration membrane was compared to that of the multifunctional membrane. It can be shown that the PES ultrafiltration membrane and the multifunctional membrane were both able to completely reject PEG more than 600 kDa, and the PEG rejection of the multifunctional membrane was much higher than that of PES ultrafiltration membrane for the MWCO ranging from 20 to 600 kDa. The results further demonstrate that the immobilization of 49.7 wt % hollow ferroferric oxide particles in the pores of the PES ultrafiltration membrane did not affect its ultrafiltration performance.

According to test results, 5 L water containing "multiple pollutants" can be treated by the multifunctional membrane in one run. The reusability of multifunctional membrane can be realized by multiple adsorption-desorption runs. In addition, the adsorption performance for the blank PES ultrafiltration membrane after PDA modification was investigated. The effective treatment volume of the blank PES ultrafiltration membrane after PDA modification was 0.3 L. Both of the blank PES membrane after PDA modification and the multifunctional membrane can keep rejecting colloidal gold and PEGs all the time.

The above embodiments are only to illustrate the technical idea of the present invention, and they are not to limit the scope of the present invention. It shall be understood that any modifications made based on the claimed technical solution and without departing from the technical idea of the present invention, would fall within the scope of the present invention.

What is claimed is:

1. A method for preparing an ultrafiltration membrane, the ultrafiltration membrane comprising a sulfone polymer membrane matrix with pores and an organic polymer sealing layer, wherein the pores are filled with nanoadsorbents, the nanoadsorbents are porous hollow nanoparticles, and the porous hollow nanoparticles are hollow porous hydrous zirconium oxide (HZO) particles, the method comprising the following steps:
   (1) synthesizing the nanoadsorbents;
   (2) preparing the sulfone polymer membrane matrix by immersion-precipitation phase inversion, wherein the sulfone polymer membrane matrix has a top surface and a bottom surface opposite to each other, the pores extend from the bottom surface of the sulfone polymer membrane matrix toward the top surface of the sulfone polymer membrane matrix; and
   (3) immobilizing the nanoadsorbents in the pores of the sulfone polymer membrane matrix by filling the nanoadsorbents into the pores from the bottom surface of the sulfone polymer membrane matrix, then sealing the pores with organic polymers to form the ultrafiltration membrane.

2. The method according to claim 1, wherein a procedure of the immersion-precipitation phase inversion comprises the following steps:
   (1) stirring sulfone polymers, polyvinylpyrrolidone and N—N dimethylformamide constantly in oil bath to obtain a uniform and homogeneous casting solution, then leaving the casting solution to stand to remove remaining air bubbles, and spreading the bubbleless casting solution with a casting knife onto a clean glass plate of which a temperature is 60~100° C. to form a membrane;
   (2) standing the glass plate in air for evaporation and then immersing it in a non-solvent bath; and
   (3) taking out the resulting membrane and rinsing it in deionized water to obtain the sulfone polymer membrane matrix which is then kept in deionized water before use, wherein the procedure of filling the nanoadsorbents into the pores from the bottom surface of the sulfone polymer membrane matrix comprises the following steps:
   (1) dispersing the synthesized nanoadsorbents in water by ultrasound to form a nanoadsorbent solution; and
   (2) placing the bottom surface of the sulfone polymer membrane matrix upside down in a stirred ultrafiltration cell in order that the bottom of the sulfone polymer membrane matrix is facing the filtrated nanoadsorbent solution and filling the polymer membrane matrix with the filtrated nanoadsorbent solution under controlled pressure, wherein the pressure ranges from 0.01 Mpa to 0.1 Mpa.

3. The method according to claim 1, wherein the pores are finger-like in shape.

4. The method according to claim 1, wherein the pore sizes are 10~40 μm×90~150 μm.

5. The method according to claim 1, wherein the porosity of the ultrafiltration membrane is 65%~80% before the pores are filled with the nanoadsorbents and 35%~50% after the pores are filled with the nanoadsorbents.

6. The method according to claim 1, wherein a content of the nanoadsorbents is 10%~70%.

7. The method according to claim 1, wherein the organic polymers are polydopamine or polyvinyl alcohol.

8. The method according to claim 2, wherein the sulfone polymers are polysulfone and polyethersulfone.

* * * * *